Jan. 23, 1934.  E. W. HAMCKE  1,944,864
HOLLOW CABLE
Filed March 28, 1932
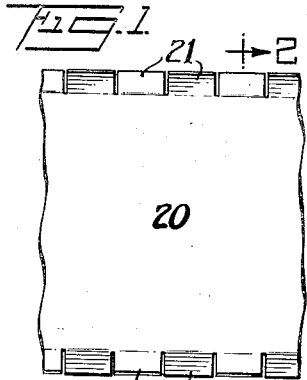
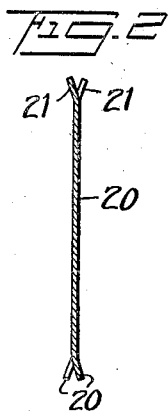
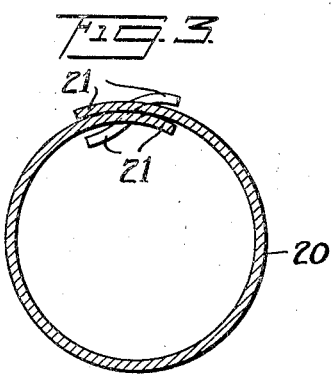
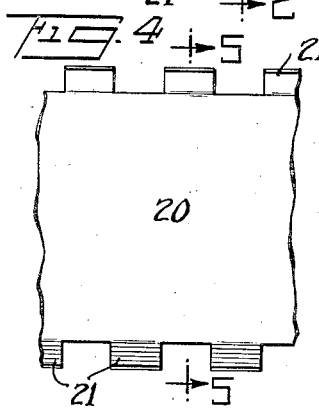
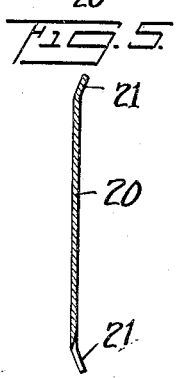
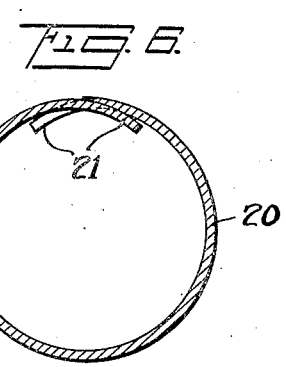
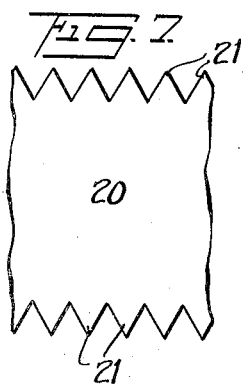
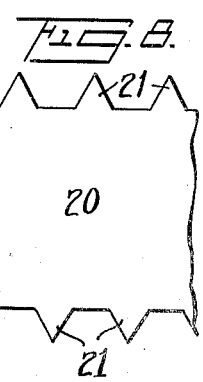
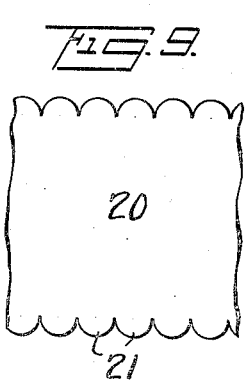
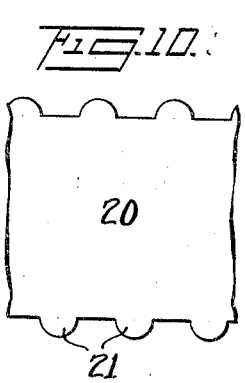
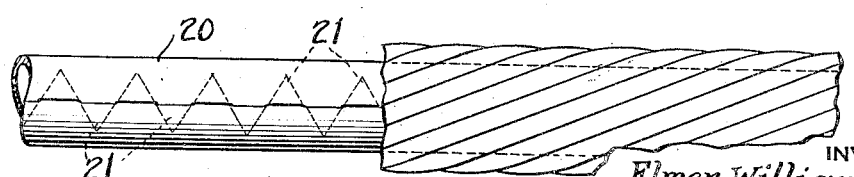
INVENTOR
Elmer William Hamcke
BY
ATTORNEY Patented Jan. 23, 1934

1,944,864

UNITED STATES PATENT OFFICE 1,944,864

HOLLOW CABLE

Elmer William Hamcke, Brooklyn, N. Y., assignor, by mesne assignments, to Phelps Dodge Copper Products Corporation, New York, N. Y., a corporation of New York Application March 28, 1932. Serial No. 601,517

3 Claims. (Cl. 173—13)

My invention relates to electrical conductors and more particularly to hollow core conductors designed for the transmission of electrical power by means of very high voltages.

Conductors of this class have been some times constructed of one or more layers of wire laid helically upon a supporting core, this core being made from a strip of flat metal formed into a tubular shape, the edges of the seam of the tube thus formed being without deformation to prevent these edges slipping by each other under the radial stresses incident to the manufacture and use of the conductor. When such a core is used, the conductor is liable to collapse under stress, due to such slipping by of the edges of the core.

Sometimes the core has been reinforced against such collapse by some interior means such as a helically twisted strip inside the tube. When this means of reinforcement is used, the material of the cable is not disposed to the best advantage for the attainment of the electrical effect desired, the weight of the conductor for a given conductivity is increased, and the cost of manufacture is increased.

The object of my invention is to present a cable that will have all the advantage of the cable with a tubular shaped core formed from flat metal, but constructed so that deformation under stress is resisted by the abutting edges being so formed that slipping by or overlapping cannot occur, so that the weight and cost of interior reinforcements are eliminated.

My invention consists of a tube formed from flat metal, the abutting edges thereof being serrated and so arranged that the edges mutually support each other against the tendency to slip by or overlap under radial loads.

The foregoing and other features of my invention will now be described in connection with the accompanying drawings, forming part of this specification, in which I have represented my hollow cable in its preferred form, after which I shall point out more particularly in the claims those features which I believe to be new and of my own invention.

In the drawing:—

Figure 1 is a plan view of a blank from which the hollow core is formed.

Figure 2 is a section on line 2—2, Figure 1.

Figure 3 is a cross section through the core when the blank shown in Figures 1 and 2 is rolled into a tube.

Figure 4 is a plan view of another form of blank.

Figure 5 is a section on line 5—5, Figure 4.

Figure 6 is a cross section through the core when the blank shown in Figures 4 and 5 is rolled into a tube.

Figures 7-10 show modifications of the serrations which I may employ.

Figure 11 is a view of my hollow core cable in part section.

In the carrying out of my invention I employ a strip of flat metal 20 with serrated edges 21. In the form like those shown in Figures 1, 7 and 9 the serrations thus formed are alternately up and down, as shown in Figure 2 so that when the tube is formed, these serrations are alternately over and under each other as shown in Figure 3 so that any tendency of the tube to collapse is resisted by the edges being held firmly in position by the alternate inside and outside positions of the serrations.

In the form shown in Figures 4, 5 and 6, which is the preferred form, I have removed alternate serrations, a projection on one side of the strip corresponding to a recess on the other side of the strip, and bending all the serrations down, so that when the tube is formed these serrations are all inside the tube as shown in Figure 6, thus permitting a truly circular tube to be formed in which the tendency of the tube to collapse is resisted by the edges being held firmly in position against radial stress by the serrations being alternately to the right or left of the median line of the joint.

I do not wish to confine myself to the form of serrations shown in Figures 1-6, but may use other forms such as triangular, as shown in Figures 7 and 8 or semi-circular, as shown in drawings 9 and 10 or any other shape.

In Figure 11 I show the application of the core to a completed conductor, in which one or more layers of wire are laid helically (commonly known as stranded) upon the core.

I wish it distinctly understood that my hollow cable herein described and illustrated is in the form in which I desire to construct it and that changes or variations may be made as may be convenient or desirable without departing from the salient features of my invention and I therefore intend the following claims to cover such modifications as naturally fall within the lines of invention.

I claim:

1. In a flexible conductor cable having a large outside diameter relative to its metallic area, a core comprising an open seam tube having serrated edges, the serrated edges being interlaced so that radial stresses are resisted by the interlaced arrangement of the serration, including an annular outer surface of high electric conductivity comprising a plurality of wires stranded thereon.

2. The device of claim 1 in which the stranded wires of the outer surface are laid helically upon said core.

3. A flexible conductor cable having a large outside diameter relative to its metallic area and including a core of thin wall open seam tubing, the edges of which being serrated, the alternate serrations being removed and all serrations bent down, so that all the serrations will be inside the tube forming a smooth circular exterior to support an outer layer of conducting material comprising a plurality of wires stranded thereon.

ELMER WM. HAMCKE.